(No Model.)
M. HERNANDEZ.
TUNING KEY.
No. 384,442. Patented June 12, 1888.
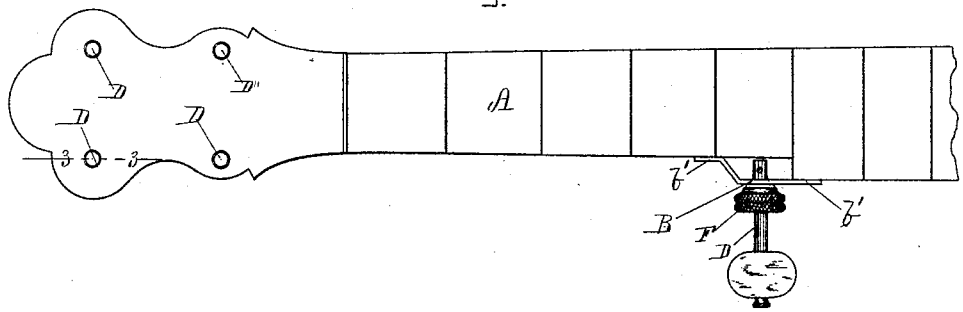
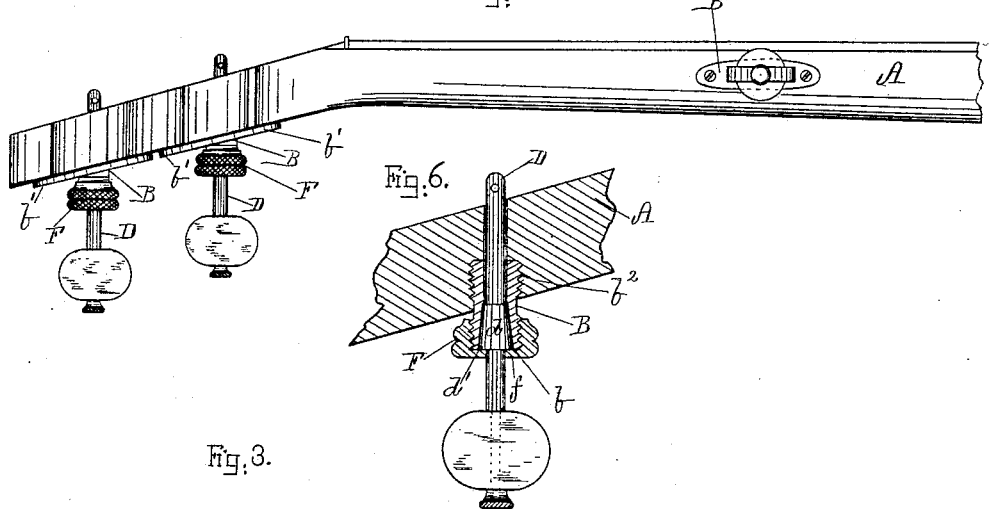
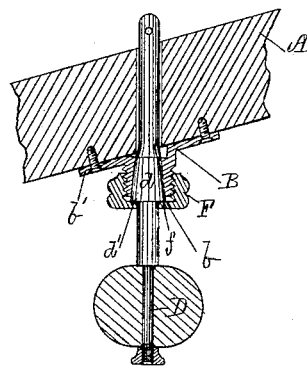
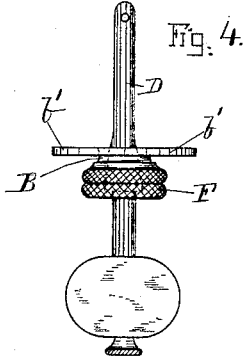
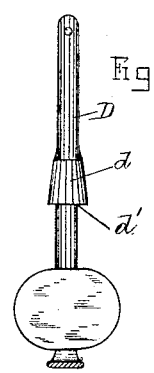
Witnesses
Edward S. Peach
John R. Snow
Inventor
Melquiades Hernandez
by J. E. Maynadier
Atty

UNITED STATES PATENT OFFICE.

MELQUIADES HERNANDEZ, OF WALTHAM, MASSACHUSETTS.

TUNING-KEY.

SPECIFICATION forming part of Letters Patent No. 384,442, dated June 12, 1888.

Application filed March 8, 1888. Serial No. 266,591. (No model.)

*To all whom it may concern:*

Be it known that I, MELQUIADES HERNANDEZ, a subject of the King of Spain, residing at Waltham, in the county of Middlesex and State of Massachusetts, have invented a new and useful Improvement in Tuning-Keys, of which the following is a specification, reference being had to the accompanying drawings, in which—

Figure 1 is a plan of a portion of the neck of a banjo provided with my new keys. Fig. 2 is a side view of what is shown in Fig. 1. Fig. 3 is a sectional view illustrating one form of key in place. Fig. 4 is an elevation of one form of my new key detached. Fig. 5 is an elevation of the peg which forms part of my new key. Fig. 6 is a sectional view of another form of key embodying my invention secured to the neck of an instrument.

My invention is a tuning-key for stringed instruments; and it consists in the combination of a support having a tapered hole with a tapered peg and means for clamping the tapered peg in the support.

In the drawings, the support, which is readily made in various forms, some of which are illustrated, is marked B, A being the neck of the instrument to which the key is attached. Support B has a tapered hole, $b$, and is readily secured to the neck of the instrument, say, by means of screws through arms $b'$, with which it may be provided, as shown in Figs. 1 2, 3, and 4; or it may be otherwise formed for connection with the neck—for example, with external threads, $b^2$, at its inner end, as in Fig. 6—and so be screwed into position in the neck of the instrument. The peg D is like pegs now in use, except that it has a tapered enlargement, $d$, at the outer end of which there is a shoulder, $d'$. The tapered enlargement $d$ is made to fit nicely in the tapered hole $b$ in support B, and is clamped therein by a nut, F, having a shoulder, $f$, at one end of its female screw, which screws on the outer end of support B, the shoulder $f$ engaging shoulder $d'$ on peg D, and so forcing the peg home and clamping it tightly enough to prevent it from turning under the strain of the strings.

When it is desired to tune an instrument provided with my new keys, it is only necessary to loosen the nuts F slightly to allow the pegs to be turned sufficiently for the purpose of tuning, the friction of the pegs in their holes being sufficient to keep the pegs temporarily in place. When the strings are brought to the required degree of tension, the nut is set up and the peg clamped in place.

What I claim is—

The improved tuning-key hereinbefore described, made up of a support, B, having a tapered hole, $b$, a tapered peg, D, having a shoulder, $d'$, and a nut, F, support B receiving nut F and peg D, and nut F engaging the shoulder on the peg to force it home, substantially as and for the purpose set forth.

MELQUIADES HERNANDEZ.

Witnesses:
EDWARD S. BEACH,
JOHN R. SNOW.